(12) United States Patent
Domahidi

(10) Patent No.: US 12,037,026 B2
(45) Date of Patent: *Jul. 16, 2024

(54) METHOD FOR STEERING A VEHICLE AND APPARATUS THEREFOR

(71) Applicant: EMBOTECH AG, Zürich (CH)

(72) Inventor: Alexander Domahidi, Zürich (CH)

(73) Assignee: EMBOTECH AG, Zürich (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/094,177

(22) Filed: Jan. 6, 2023

(65) Prior Publication Data

US 2023/0150548 A1    May 18, 2023

Related U.S. Application Data

(63) Continuation of application No. 17/262,641, filed as application No. PCT/EP2019/070398 on Jul. 29, 2019, now Pat. No. 11,577,755.

(30) Foreign Application Priority Data

Jul. 27, 2018 (EP) .................................... 18186080

(51) Int. Cl.
*B60W 60/00* (2020.01)
*B60W 30/06* (2006.01)
(Continued)

(52) U.S. Cl.
CPC ........ *B60W 60/0027* (2020.02); *B60W 30/06* (2013.01); *B60W 30/0956* (2013.01);
(Continued)

(58) Field of Classification Search
CPC ... B60W 2050/0031; B60W 2510/207; B60W 2530/201; B60W 2554/00;
(Continued)

(56) References Cited

U.S. PATENT DOCUMENTS 9,227,632 B1    1/2016 Lee
9,969,386 B1    5/2018 Wang et al.
(Continued)

FOREIGN PATENT DOCUMENTS

CN           104464367 A    3/2015
DE        102014224073 A1    6/2016
(Continued)

OTHER PUBLICATIONS

European Patent Office, "International Search Report and Written Opinion, Application PCT/EP2019/070398 filed Jul. 29, 2019", Jan. 30, 2020, 16 pages.

*Primary Examiner* — Peter D Nolan
*Assistant Examiner* — Ce Li Li
(74) *Attorney, Agent, or Firm* — Mannava & Kang, P.C.

(57) ABSTRACT

A method for steering a vehicle along a path in a driveway and around obstacles between a starting position into a target position, comprises the steps of determining the vehicle dimensions, steering and driving capabilities, carrying out a path optimization step to evaluate, based on a predetermined cost function, the least costly path between the starting position and the target position avoiding any collisions with obstacles. The method further comprises the further step of applying a path improver step, smoothening the trajectory obtained by the path optimization method by means of numerical optimization while fulfilling dynamical constraints on acceleration and steering rate of the vehicle through planning lateral and longitudinal movement of the vehicle in a joint optimization problem or by means of separate optimization problems.

17 Claims, 6 Drawing Sheets

(51) Int. Cl.
*B60W 30/095* (2012.01)
*B60W 40/105* (2012.01)
*B60W 40/12* (2012.01)
*G08G 1/0967* (2006.01)
*G08G 1/0968* (2006.01)

(52) U.S. Cl.
CPC .......... *B60W 40/105* (2013.01); *B60W 40/12* (2013.01); *B60W 60/0011* (2020.02); *G08G 1/096725* (2013.01); *G08G 1/096775* (2013.01); *G08G 1/096855* (2013.01); *B60W 2554/20* (2020.02); *B60W 2554/4041* (2020.02); *B60W 2556/45* (2020.02)

(58) Field of Classification Search
CPC ..... B60W 2554/20; B60W 2554/4041; B60W 2556/45; B60W 2710/20; B60W 30/06; B60W 30/0953; B60W 30/0956; B60W 40/105; B60W 40/12; B60W 60/0011; B60W 60/0027; B62D 15/027; B62D 15/0275; B62D 15/028; B62D 15/0285; B62D 15/029; B62D 15/0295; G08G 1/096725; G08G 1/096775; G08G 1/096855

See application file for complete search history.

(56) References Cited

U.S. PATENT DOCUMENTS

| | | | |
|---|---|---|---|
| 2005/0057374 | A1 | 3/2005 | Tanaka et al. |
| 2012/0101654 | A1 | 4/2012 | Samples et al. |
| 2014/0368636 | A1* | 12/2014 | Lee .................... B62D 15/0285 348/118 |
| 2019/0337507 | A1* | 11/2019 | Stein ................. B60W 50/0097 |
| 2021/0163068 | A1* | 6/2021 | Zhu .................... B62D 15/0285 |

FOREIGN PATENT DOCUMENTS

| | | |
|---|---|---|
| DE | 102015222934 A1 | 5/2017 |
| WO | 2015028316 A1 | 3/2015 |
| WO | 2016198139 A1 | 12/2016 |
| WO | 2017041943 A1 | 3/2017 |

* cited by examiner

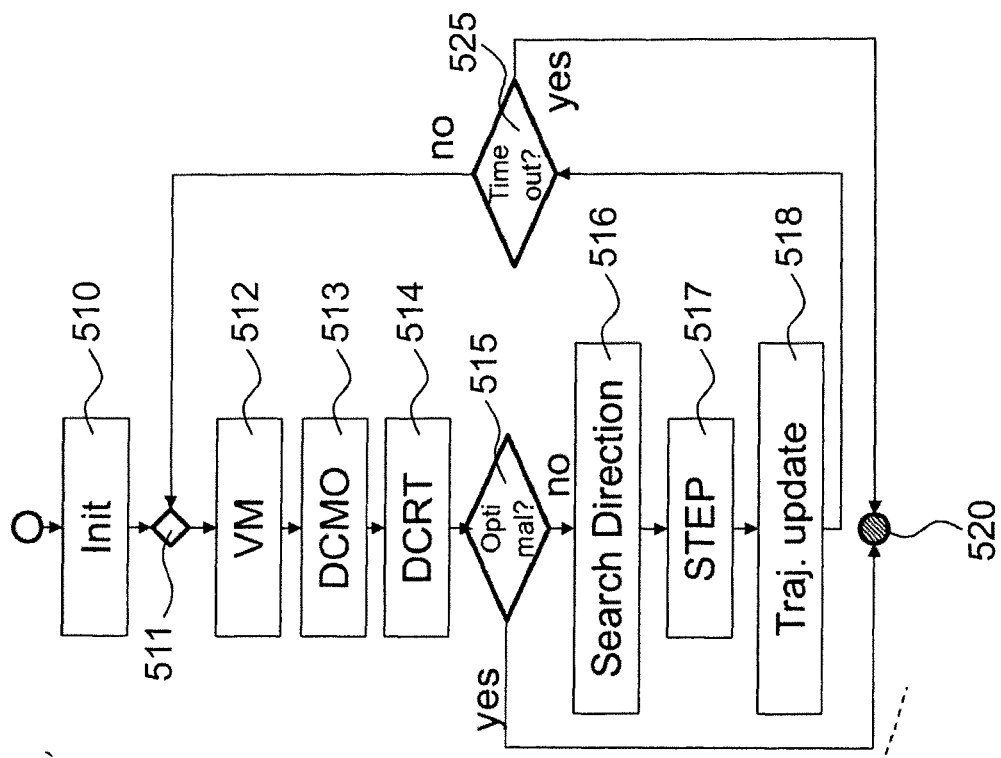
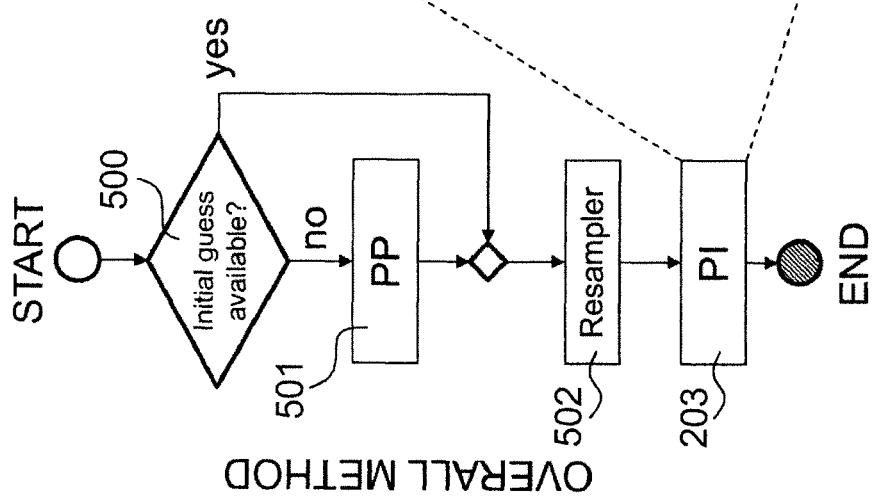
Fig. 4

METHOD FOR STEERING A VEHICLE AND APPARATUS THEREFOR

CLAIM FOR PRIORITY

The present application is a continuation of U.S. patent application Ser. No. 17/262,641, having a filing date of Jan. 22, 2021, which is a national stage filing under 35 U.S.C 371 of PCT application number PCT/EP2019/070398, having an international filing date of Jul. 29, 2019, which claims priority to European patent application number 18186080.0 having a filing date of Jul. 27, 2018, the disclosures of which are hereby incorporated by reference in their entireties.

TECHNICAL FIELD

The present invention relates to a method for steering a vehicle along a path in a driveway and around obstacles between a starting position into a target position as well as an apparatus therefor.

PRIOR ART

WO 2015/028316 A1 discloses a method for steering a vehicle along a path and around obstacles between a starting position into an end position. The path comprises a plurality of linear path parts which are defined by a step size and a steering angle. The method according to WO 2015/028316 A1 comprises the steps of a) determining a maximum steering angle range and a maximum and a minimum step size range; b) determining the current distance to the intended end position and a target angle as well as the angle difference between the current vehicle angle and the target angle; c) carrying out an optimization method in order to determine a path part by minimizing the value of a cost function assigned to the path part, d) determining the new position by adding the determined path part to the current position; and finally e) repeating the steps b) to d) until the end position is reached with sufficient accuracy. The cost function comprises the current distance to the end position and the current angle difference with respect to the target angle as optimization variables which are weighted independently of one another, and the maximum steering angle range, the maximum and minimum step size ranges and a collision check are provided as boundary conditions.

This prior art document describes an optimization step-by-step and it is not disclosed how the obstacle avoidance is realized besides naming a function without further reference. Furthermore, the method only relies on path parts without taking into account the factor time.

US 2012/101654 A1 discloses a similar method and mentions in [0032] relating to a figure that the method according to said document also takes into account both the amount of time to complete a path trajectory to a destination as well as the distance traveled as factors similar to collision avoidance and legal restraints.

Other methods to control the automatic displacement of a vehicle are shown in DE 10 2015 222 934 with an automatic valet parking, where a vehicle shall automatically be guided from a start position to a target position without colliding with static or dynamic (i.e. moving) obstacles.

WO 2017/041943 discloses a method to guide a car safely from a starting position to an end position by successively computing pieces of movement in the range visible to sensors provided in the car.

In DE 10 2014 224073, a server to operate a parking facility is disclosed that communicates with cars and sends the drivable space in form of maps to the cars.

U.S. Pat. No. 9,969,386 B1 discloses a method for steering a vehicle along the path in a driveway with the features of the preamble of claim 1.

U.S. Pat. No. 9,227,632 B1 discloses a system and a method for providing path planning for evasive steering maneuver and generation, wherein continuity assumptions are employed in the algorithm for a smooth path and include the start position and the orientation angle of the desired path aligned with the current vehicle position and the vehicle moving direction, where a lane change path should finish at the center of the destination lane and align with the lane in the first and second order derivatives.

WO 2016/198139 discloses a parking facility system comprising at least one parking space and used by at least a first group of manually operated traffic participants and a second group of automatically operated traffic participants. The method uses a central control device for determining, for each traffic participant of the first and second groups of traffic participants, operation of each traffic participant in a common route planning in the parking environment, wherein instruction information, via a communication link, is transmitted to the traffic participants, wherein the instruction information is used for outputting information or automatically controlling each traffic participant.

SUMMARY OF THE INVENTION

For maneuvering ground vehicles autonomously, the control unit responsible for the operation of the vehicle requires the computation of a guidance trajectory that is collision-free and that can be safely followed by the vehicle or vehicle configuration by using its low-level control functions. Such trajectory computation needs to be carried out in a reasonable time, in the region of a fraction of a second, to be useful for automatic maneuvering of vehicles. The problem to be solved by the present invention may be regarded as an improved trajectory determination.

In the context of this invention, a trajectory is to be understood as a collection of time-stamped or path-length-stamped segments that describe the future configuration (position, heading, etc.) of a vehicle, its dynamic states including for example, but not limited to, velocity and acceleration, as well as vehicle inputs such as jerk or change of yaw rate. The segments can be zero-order hold segments (piecewise constant between times), or can assume a certain functional shape (e.g. piece-wise linear or cubic polynomial etc.).

In the context of this invention, a vehicle or vehicle configuration is to be understood as a ground vehicle (such as a car, a bus, a lorry, a tractor or a trike), with or without one or multiple trailers. The vehicle may be steered via its front or rear axle, may have multiple steered axles, or can be steered by some other means such as, for example, torque vectoring.

This invention is related to an improved method providing guidance trajectories with the purpose of safely maneuvering one or multiple ground vehicles or vehicle configurations simultaneously in tight environments between a start and target configuration. In the case of a plurality of ground vehicles, there are adapted target configurations changing over time, when one or more ground vehicles are reaching an end position, being part of the target configuration, and when one or more new ground vehicles are added ad hoc to the present configuration and modify the target configuration of the system. Furthermore, it is an object of the invention to include the relative position of a plurality of moving vehicles over time.

The method according to the invention provides joint lateral and longitudinal planning, that is, the forward and backward movement of a vehicle along a path is jointly planned with the steering. This avoids dynamical infeasibilities and reduces the mismatch between planned and driven trajectory, enhancing safe operation of the autonomous vehicle over state-of-the-art methods.

The method according to the invention provides joint computation of configuration space path and dynamical trajectory. WO 2015/028316 A1 provides a method computing a geometrical path. Since the vehicle has to move to reach the target as outlined in the prior art, in a second step the velocity/acceleration/steering schedule is computed. The present invention increases safety and efficiency since the joint computation ensures that the trajectory is feasible for the vehicle and its control systems, thus reducing the number of potential collisions and decreasing the area required for maneuvering.

A further beneficial consequence of the advantages conferred by the above method element is an improved ability to provide trajectories in tight environments respecting the actual physical capabilities of the car. This includes on one hand a calculation of the path which will be taken by the vehicle, i.e. the kinetic envelope of the vehicle, which can include the implications and restrictions due to the car and its usual parameters such as the technically feasible turning radius, but on the other hand also comfort considerations—in the sense that, for example, the technically feasible turning radius is not the turning radius which shall be used but a larger one—so that this influences the path and its curvatures. Therefore, the method according to the invention combines these two geometrical restrictions within the evaluation of a path. Another example for a comfort setting are the maximally allowed accelerations as well as the initial gear selection to be used at the start of the maneuver, which can be either pre-defined or the method choses the best gear automatically.

The method works independently of pre-defined situations such as parallel parking, perpendicular parking etc., i.e. it is suitable for fully autonomous operation of vehicles, and e.g. it can be applied with a remote control of the vehicle.

The method is fully configurable to the vehicle by a simple set of geometrical and physical parameters of the vehicle (and potential trailers).

The method provides atomic elements as an interface to be agnostic to particular sensors and environmental model. Simple building blocks are provided that build up the map of obstacles and/or free/drivable space. The map will dynamically develop over time when moving objects such as obstacles, e.g. other vehicles or pedestrians, are included. This relates to the combination of the abovementioned geometrical and vehicle-related conditions with the dimension of the travel of the path in time and possible collisions due to other moving obstacles as e.g. vehicles and pedestrians. The simple building blocks consist of basic convex geometrical shapes, e.g. points, polytopes, half-spaces, circles/balls, ellipsoids, cones etc. A specific obstacle may be represented by the union of these basic shapes to model non-convex shapes. For moving obstacles, the interface provides the possibility to input trajectories of paths or time evolutions of the objects in space. Another interface layer reads in non-convex shapes and segments them into a union of convex objects and passes this to the first interface.

According to the invention, the method computes a trajectory from start to target configuration in one shot and is as such faster than prior art solutions. In the present context the trajectory is computed from a start state to a target state which are also addressed as configurations.

There may be a specified tolerance on the target position within predefined allowable tolerances on the desired target configuration including position or angle tolerances.

A structure-exploiting nonlinear programming solver tailored to the specific mathematical structure and properties is used to achieve the runtimes necessary for embedded, on-vehicle implementation.

The method computes a trajectory that, when applied to a vehicle by means of a feedback control system, maneuvers a vehicle or vehicle configurations (such as vehicles with trailers) in a tight or in an open environment. It is based on a. environmental information such as the number of obstacles that need to be avoided, their location and their size, and/or the size and location of the drivable surface where the car can be located,
b. information on the current configuration/state of the vehicle (for example position, velocity, yaw angle etc.),
c. desired target configuration,
d. kinematic parameters of the vehicle or vehicle configuration such as length and width, front and rear overhang, wheel base, as well as physical capabilities of the steering system, etc. If one or multiple trailers are present, these parameters are given for all trailers and the configuration, and
e. comfort constraints, for example acceleration and jerk that the vehicle shall obey if at all possible.

In order to determine a drivable path and inputs for the vehicle, the method uses (i) a distance computation method (DCM), comprising the steps of
1. determining a distance measure of the vehicle to an obstacle, including a measure of penetration depth in case the vehicle would penetrate obstacles,
2. returning a positive value if the vehicle does not intersect with the obstacle, and a negative value if it does intersect (collide),
3. furthermore returning sensitivities (derivatives) of the distance (and depth) with respect to the configuration of the vehicle and other variables under consideration, e.g. time, etc.,
4. furthermore determining the distance to moving obstacles for which predictions about the obstacles configuration in the future are available (e.g. another car crossing a certain area), as well as sensitivities in relation to time and configuration of the controlled vehicle's configuration.
(ii) a vehicle model (VM) that describes, by physical equations of motion, the motion of the vehicle or vehicle configuration in a world coordinate frame.
(iii) a path planner (PP), which uses DCM and VM to plan a collision-free initial path from initial position to target position. The global path planner employs a search method on a discrete set of the configuration space for obtaining paths. The discretization can be achieved by gridding, sampling, or dividing the space into cells of the configuration space of the vehicle to explore the drivable surface. A graph of discrete points or cells is connected through arcs of movement, which the VM provides. These arcs can be arbitrarily complicated; however, they are typically of simple geometry such as straight lines, curves, clothoids etc. that can easily be tracked with low-level feedback controllers such as PID, LQR, or MPC. The search method uses cost functions for rating the transition from a certain configuration to another to determine the best path from start to target position. Infeasible configurations, i.e. configurations that are not admissible due to e.g. collision with obstacles, are assigned an infinite cost, which avoids that the method selects them. Multiple costs measuring different criteria can be combined into a single cost by a weighted sum. Typical costs are length of movement, distance from the target position or the number of direction changes.

(iv) a path improver (PI), which smooths the trajectory obtained by PP by means of numerical optimization. The optimization scheme makes use of DCM and VM to find a collision-free trajectory close to the one obtained by PP, but fulfilling dynamical constraints such as acceleration and steering rate limits, which the PP path does not necessarily fulfil, and which plans lateral and longitudinal movement of the vehicle in a joint optimization problem or by means of separate optimization problems. The PI is based on gradient information and uses first- or second-order numerical methods for continuous optimization to compute one trajectory from start to target and fulfilling all constraints.

The PI of the present invention takes into account obstacles, static obstacles and moving obstacles which can appear after having started the movement on the path. The gradient information and first- or second-order numerical methods used by the PI according to the present invention are based on a polynomial function of third or higher degree, preferably of fifth degree, for the instant path, whereas U.S. Pat. No. 9,227,632 B1 only uses the derivatives of said order to obtain a continuous function of trajectory portions between lane boundaries.

The method of the present invention uses the solution of a differential equation system and derivatives of first and second order.

The method can be applied in an apparatus that is implemented or installed on-board of the vehicle to be controlled, communicating with local vehicle sensors and low-level vehicle systems that realize the required control inputs, i.e. follow the given guidance trajectory.

Such an apparatus can comprise a distance computation unit configured to determine distances and sensitivities of distances of obstacles, a path planning unit configured to plan a collision-free initial path from an initial position to a target position and a path improving unit configured to plan lateral and longitudinal movement of the vehicle in a joint optimization problem or by means of separate optimization problems.

An apparatus for steering a vehicle along a path in a driveway with the features of the previous paragraph can also be provided for a general steering method. The path in a driveway can comprise a specific length and can end with speed 0 or be calculated for ongoing extended paths.

The method according to the invention preferably takes into account uncertainty information on the obstacle positions, sizes, and plans robustly against these uncertainties to minimize the effect of sensor and parameter uncertainty on the planned trajectories or movement. This can, inter alia, be done, in that the method artificially increases the size of obstacles by an appropriate amount to deal with uncertainty or model mismatch.

The method can take into account the range of sensors, and restricts the movement of the vehicle to only as far as it is safe to go. Such other dynamical constraints of the vehicle can be taken from the group encompassing intervals of acceleration, intervals of deceleration, predetermined speed interval, and steering rate of the vehicle. The least costly path can then comprises at least one stop portion for a predetermined time interval to avoid collisions or bottlenecks on the predetermined path. Additionally or as alternative at least one time dilatation portion can be provided having a scaled-down velocity for the predetermined path. Finally, additionally or as alternative at least a time shortening portion can be provided having a scaled-up velocity for a determined path with the proviso that the acceleration and deceleration does not exceed the predetermined limits or constraints of the vehicle. Predetermined limits are usually provided for the comfort of the user in the vehicle or limits on the driveway imposed by the authorities.

Information about detected obstacles over time, especially when the vehicle is already moving, can be supplied from an on-board sensor fusion system which combines inputs from arbitrary sensors on- and off-board the vehicle. Such information about detected obstacles can be directly supplied by on-board sensors such as cameras, RADAR, LIDAR or ultrasound.

Information about persistent static obstacles to be avoided is supplied from a digital map available to the vehicle.

It is preferred that the method can use predictions of future configurations of dynamic obstacles by means of extrapolation methods based on the currently detected configuration of the dynamic obstacle. A dynamic obstacle is an obstacle which is not static, i.e. which moves at the same time or at least partially at the same time when the controlled vehicle is moving and possibly intersects the current or one of the intended paths of the controlled vehicle. Predictions of future configurations of dynamic obstacles can be provided by an external prediction system. The PI of the present invention provides, within the DCM as explained below, uses the distance function including appearing static and moving obstacles to provide an improved path and velocity, wherein U.S. Pat. No. 9,969,386 only provides an optimal velocity on a previously calculated path. The method according to the present invention, while varying path and velocity (and thus also change acceleration over time) can reduce the number of direction changes from e.g. 5 down to 3 with an collision free optimized path with higher comfort for the passenger in the vehicle, wherein U.S. Pat. No. 9,969,386 cannot influence on the number of direction changes and path length.

The method can also be applied to infrastructure-based parking. There, it can also use off-board information such as mapping data to perform the computations. Further facility-related information can be obtained from off-board sensors, e.g. cameras, LIDARs etc., which are monitoring the maneuvering space via a communication interface in order to perform the computations. Preferably the method then runs off-board in the cloud or in the infrastructure and communicates to the vehicle, via a wireless communication link, the planned guidance trajectories according to the method for one vehicle in real-time.

A further preferred application is to combine the method in use case for multiple vehicles. Such a method coordinates and maneuvers multiple vehicles, wherein each single path or trajectory is determined according to the method as described above, where multiple trajectories are computed for multiple vehicles simultaneously. Therefore, the DCM, as mentioned above, includes distance computations to other vehicles, and PP and PI are executed to solve the joint problem of maneuvering multiple vehicles in tight, confined spaces. PP and PI are executed such that all cars are taken into consideration and the path is planned for all vehicles at the same time. It may also be that PP is done for each car separately and then PI does the planning for all cars together.

A prioritization of vehicles can be performed, which allows to sequentially execute the method of the invention (with DCM adjusted to take into account other vehicles) in descending order of priority.

In a post-processing step, a time dilatation or shift is applied in order to create collision-free trajectories out of trajectories computed independently from each other, without taking into consideration other vehicles.

The method according to the invention finds a further application within planning of parking facilities to detect problematic driving situations in a simulation mode. Such a method analyzes an environment represented in a digital map with respect to the effectively drivable space. This method uses trajectory computations based on the method as mentioned above to determine what configurations in a given map are reachable by a given vehicle. Such a method can use computer simulations to suggest improvements to the map, e.g. to increase the effectively drivable space or to reach identical configurations in a smaller space by removing unreachable space from the map. Similarly, such a method can use computer simulations to identify bottlenecks and certain parking or packing patterns well suited for efficient operation of a facility.

The step of determining distance and determining sensitivities of distances of obstacles can comprise the input of a number of vehicles in a joint optimization problem or by means of separate optimization problems.

Such connected vehicles can comprise user-driven vehicles and apparatus-driven vehicles. Then the apparatus is preferably a central computer connected with a wireless connection to all connected vehicles and further comprises a drive command transmitter and is configured to deliver driving signals to any apparatus-driven connected vehicle having a corresponding receiver and connected car control unit to control the driving path of said apparatus-driven connected vehicle from a start position to a target position and is configured to deliver driving commands to any user-driven connected vehicle to be displayed to guide the user on the driving path of said user-driven connected vehicle from a start position to a target position. Then user-driven connected vehicles are informed, e.g. via a HUD display what is expected from them as next maneuver whereas apparatus-driven vehicles do not need any hardware/software update beside a car control unit to control the driving path of said apparatus-driven connected vehicle which means control over acceleration, deceleration, steering and gear if not automatically adjusted.

The method uses sensitivities with respect to the vehicle configuration. This relates in other words to derived values of the vehicle configuration in the mathematical sense.

A parking facility system comprises an apparatus as mentioned above, wherein a plurality of perception sensors are configured to monitor the driveway and to deliver entry values for a distance computation unit of said apparatus and further comprises a drive command transmitter, wherein the apparatus is configured to deliver driving signals to any vehicle presented at an entry point of the parking facility system and having a corresponding receiver and connected car control unit to control the driving path of said vehicle from a start position to a target position. Here, user-driven connected vehicles are informed what trajectory (and speed) is expected from them as next maneuvers to a specific parking place, whereas apparatus-driven vehicles are directly controlled within their driving path to be directed to such a specific parking place. The system comprises the advantage to be able to provide a collision free trajectory calculation for all connected vehicles (and considers not-connected vehicles as moving obstacles), allowing to use automatic parking for "dumb" connected vehicles (without driver) simply based on their remote control based on wireless transmitted control signals, whereas driven vehicles receive driving instructions, wherein deviations of such human drivers from the intended path in terms of velocity and position are taking into account in the PI module. It is also possible that vehicles with users are controlled as connected vehicles without driver to allow the user to take any belongings from the car when it arrives at its final parking position.

Further embodiments of the invention are laid down in the dependent claims.

BRIEF DESCRIPTION OF THE DRAWINGS

Preferred embodiments of the invention are described in the following with reference to the drawings, which are for the purpose of illustrating the present preferred embodiments of the invention and not for the purpose of limiting the same. In the drawings.

FIG. 4 shows a flow chart describing the method for the path improver PI;

DESCRIPTION OF PREFERRED EMBODIMENTS

Figure 1:
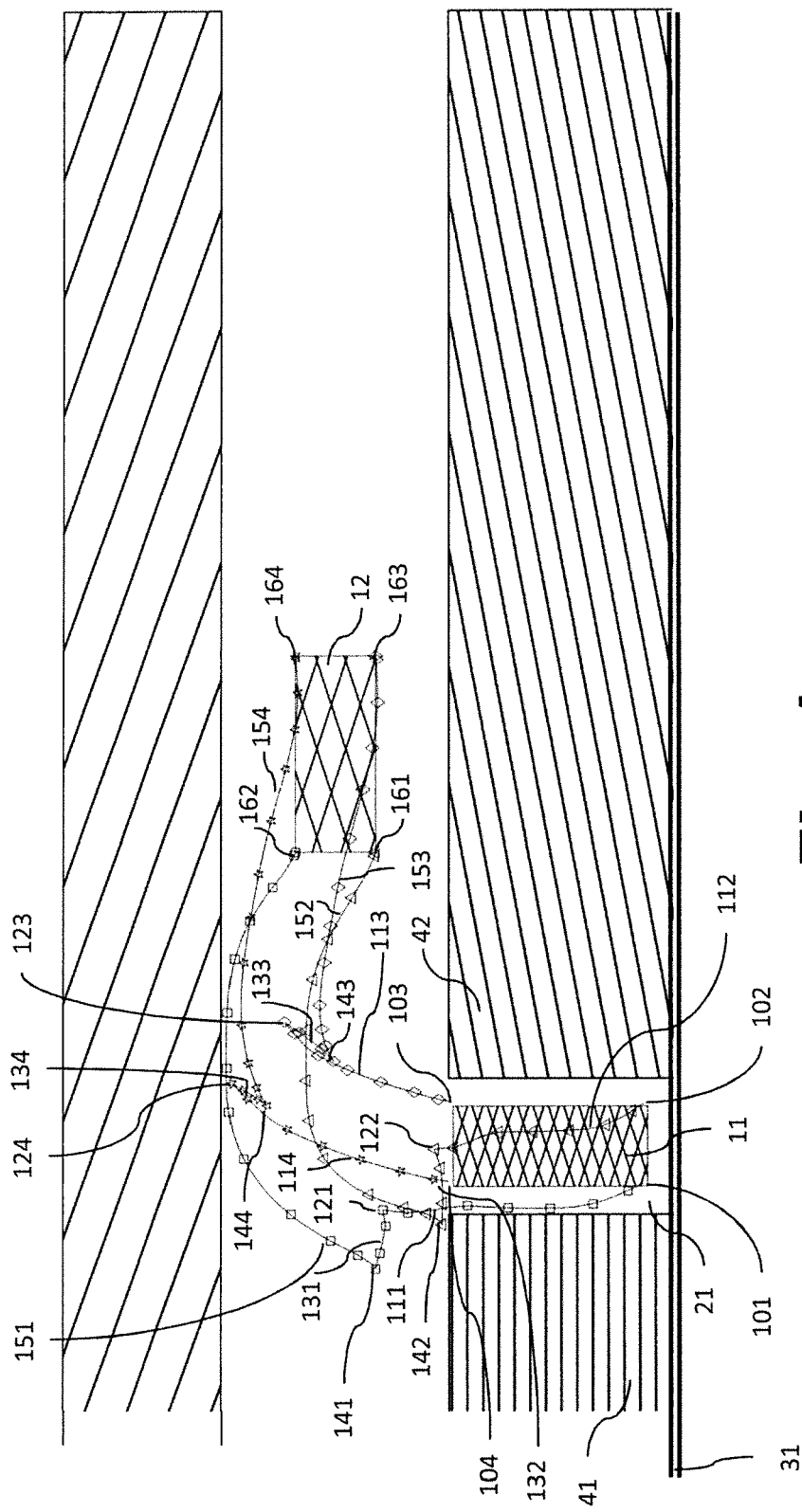
FIG. 1 shows a schematical map of an operation which is pulling a vehicle out of a parking space, carrying out the method according to an embodiment of the invention.

FIG. 1 shows a schematical map of an operation pulling a vehicle 11 out of a parking space 21 carrying out the method according to an embodiment of the invention. The map of FIG. 1 is implemented in a 2D coordinate system. If a parking garage with several levels is implemented, the map will be implemented within a 3D coordinate system, including height. A further reason to include the height, even in a one-level parking environment as 3D information, is the maximum height in parking spaces due to installation of e.g. air venting ducts etc. in a parking level.

Vehicle 11 shows its initial position in parking space 21. The vehicle 11 has four corners, 101, 102, 103, 104. The corners 101 to 104 are connected to a box symbolising the vehicle 11. More corners can be used to more accurately represent the actual vehicle shape.

The parking place 21 is a cross parking place, wherein a wall or obstacle 31 is provided in front of the box/car 11. Behind the box/car 11 there is a drivable space or driveway 50, essentially in parallel to the front wall 31. A rear wall 32 is provided on the other side of the driveway 50 as further obstacle in order not to come into contact with the car. The driveway 50 is per definitionem any allowed drive surface for a vehicle 12.

When the car 11, automatically driven by the method as described here within, leaves its parking space 21, the way of the corner points 101, 102, 103 and 104 are moving along the lines 111, 112, 113, 114 (also named corner movement lines), respectively. The calculation takes into consideration the form of the box of car 11 so that the steering deflection does not bring box/car 11 into contact with a corner 42 of the parking space, a possible obstacle, be that a column of the building structure of the parking lot or a point near the corner of a car positioned adjacently to the car 11 in parking space 41. Of course, the large box of parking space 41 can be replaced during calculation through an existing car positioned there and its actual shape.

As can be seen from FIG. 1, the driveway 50 is too narrow, so that the corner 124 of the car is stopped just in front of rear wall 32. The steering angle is adapted to show into a different direction, following the lines 131 and 132 to new intermediate corner points, i.e. points 141 and 142 connected in this ways to the former mentioned points 121 to 124. The path followed here ended near the border line of parking space 41, wherein a last reversal takes place after which the car travels to its final target position with the box car shown with reference numeral 12 and reference numerals for its corners 161, 162, 163 and 164.

Car 12 is considered to be in a target position because an end position would mean that car 12 is leaving the control zone of the present application space.

The difference between the prior art and path according to FIG. 1 is that the entire path way is calculated based on constraints explicitly considered in the optimizer to not touch the obstacles 31, 32 and 41. It uses the speed and acceleration information and takes into account moving obstacles as persons or other vehicles or cars, which are not necessarily driven or even influenced by the present method.

Figure 2:
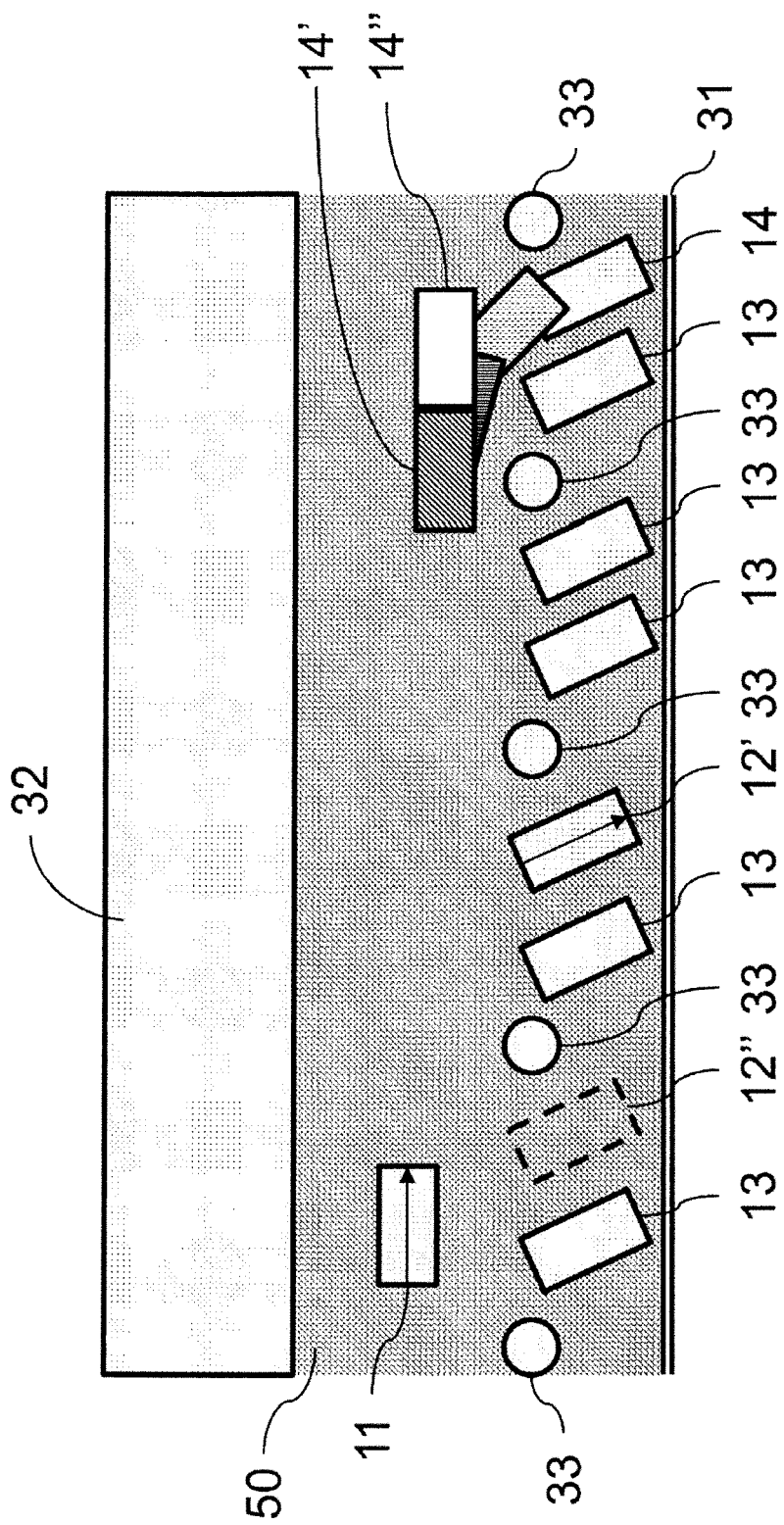
FIG. 2 shows a schematical map of an operation which is parking a vehicle in a designated parking space, carrying out the method according to an embodiment of the invention.

FIG. 2 shows a schematical map of an operation parking a vehicle 11 in a designated parking space as car target position 12, which is the end position here, carrying out the method according to an embodiment of the invention; similar features have—as afore—received similar reference numerals. There is a driveway 50, a back wall 32, whereas the front wall does not exist as such and is replaced in the drawing by a double line 131 which symbolises a soft wall, i.e. an obstacle which might be engaged. Other cars 13 are already in parking positions and there is another option for a parking spot just on the front right side of the car 11 in its initial position. The method according to the invention calculates the cost function for either place and considers parking position 12' as the preferred position. This is also due to the fact that the method observes the moving car 14, starting from its initial position 14 via the intermediate position 14' and ending at position 14" at the time that the car 12 is in its end position 12'. The path 14-14'-14" is on one hand stored in the program of the controlled car 11 as a most probable event and is on the other hand constantly monitored via recognition of the movement of the car 14. In the event. It is not shown in FIG. 2 that, had the car 14 been leaving a parking place nearer to the possible end position 12', then the method according the invention would have chosen the parking place 12" as preferred end position 12" with a lower cost in time and imponderableness connected with a moving car 14.

Figure 3:
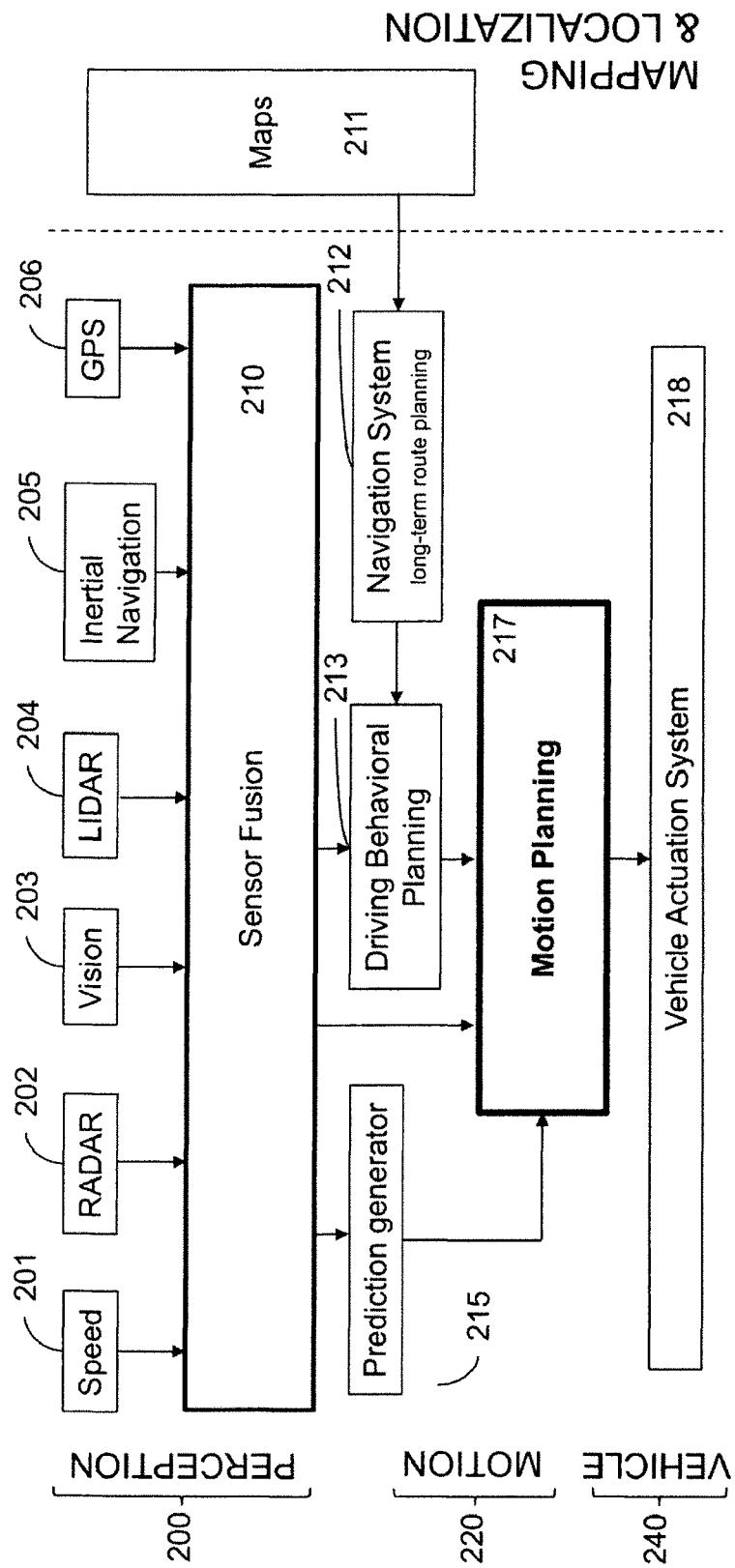
FIG. 3 shows a block diagram of an apparatus for carrying out a method according to the invention.

FIG. 3 shows a block diagram of an apparatus for carrying out a method according to the invention. The apparatus comprises a plurality of different hardware components. The perception component 200 comprises a sensor fusion element 210 having at least one or preferably a plurality of interfaces to gather information of the environment within which the car 12 is moving. These interfaces are connected to sensors such as a speed sensor 201 of the car 12 to sense the speed of the moving car, a radar sensor 202 to detect size, shape and velocity of obstacles, a vision sensor 203 to detect obstacles, especially obstacles not known and moving obstacles as cars 14 or pedestrians, as well as to identify elements of the driveable surface and their limits such as curbs or floor markings, a LIDAR sensor 204 to detect distances to obstacles and speed of moving obstacles, an inertial navigation sensor 205, usually comprising accelerometers and gyroscopes to detect position, orientation and speed of a movement including accelerations of the vehicle as well as a global positioning system sensor 206, usually applied to detect position and velocity and, if in movement, orientation of the vehicle. The sensor fusion element 210 further comprises interfaces with vehicle internal sensors such as steering angle of the wheels and further vehicle property related sensors.

Obstacles such as walls 31, 32 or columns 33 (as shown in FIG. 1 and FIG. 2) can be detected inline or previously stored in the system, especially in a construction system such as a map editor of the environment as a parking lot. External Maps 211 for longer navigation planning can be added as well in order to be connected with a navigation system 212 which is also connected with the behavioural planning unit 213, which in turn also receives the results of the sensor fusion element 210. A prediction generator 215 is also connected with the sensor fusion element 210 in order to receive data from other moving elements of the environment. Such other moving elements can be vehicles, such as vehicle 14, of the visible or ascertainable environment around vehicle 12. It is also possible to include further vehicles outside the directly ascertainable environment via external sensors. Such external sensors may be fixed sensors of e.g. a parking lot, providing e.g. information on free parking places or movement data of other vehicles which are sensed by sensors located around the parking lot. In principle it is also possible that several vehicles, e.g. 12 and 14, are exchanging and sharing information about still (such as caddies etc.) and moving (such as pedestrians etc.) obstacles in the area where the vehicles are moving.

The behavioural planning unit 213, the prediction generator 215 as well as the motion planning module 217 are part of the motion control element 220 of the apparatus executing the different method steps of the features of the invention.

The motion planning module 217 realizes the short-term dynamical path planning with obstacle avoidance. It is connected with the sensor fusion element 210 to obtain input information on own vehicle 12 data as well as information relating to obstacles 31, 32, 33, 13, 14 etc. of the environment, directly visible or via external sensors. This includes static permanent obstacles (walls 31, 32, columns 33), static temporary obstacles (such as vehicles 13, abandoned objects in the driveway 50), as well as moving temporary obstacles (such as vehicles 14 and pedestrians). The driving behavioural planning unit 213 comprises high level information relating to where to park (parking place with the reference numeral 12 or 12" in FIG. 2), how to drive (with comfort or sport threshold limits for acceleration and speed), external driving information such as speed limits, speed bumps as input for the motion planning module 217. Moving vehicles 14 or standing vehicles 13 where e.g. lights are indicating imminent movement, often have predictable movement parameters, including acceleration, speed, direction and therefore a path over time. This information is pre-calculated within the prediction generator to influence the cost decision function within the motion planning module 217.

The motion planning module 217 outputs detailed motion plan information such as position, steering, acceleration, jerk, turn rate and further car-related parameters which can be used within a following car-related car actuation element 240 provided by a vehicle actuation system 218. This vehicle actuation system 218 is implemented within a vehicle to be controlled and connected to the various control elements, such as steering control with the steering wheel, and the speed changing control information with the brake system or the accelerator.

FIG. 4 shows a flow chart describing the method for the path improver PI as part of the overall method. The method starts with an initial path inquiry step 500. Such an initial existing path may be known from a previous visit of the car in the specific environment, from a visit of a vehicle of the same type, or from a parking facility where the optimized path is known and stored. The initial path could also be from a computation that was done a few moments (fractions of a second, may be seconds) earlier. In that time, the situation might have changed, which makes a re-computation necessary.

If such an initial guess is available, the method directly goes to the resampler step 502. If such information is not available at the beginning of the method, the path planning 501 takes place. Said path planning 501 considers the constraints and uses a distance computation method (DCM) together with a vehicle model (VM) that describes, by physical equations of motion, the motion of the vehicle or vehicle configuration in a world coordinate frame. Said elements are used to plan a collision-free initial path from initial position to target position using a global search method over a discretized state space (see above). Such initial path can also be the result of the initial guess.

Based on this planned path based on static obstacles the result is used as input for the path improver function (PI), which smooths the trajectory obtained by path planning or the initial guess by means of numerical optimization.

The path improver method is shown with the sub-method steps on the right side of FIG. 4. The initialization step 510 starts with the initial collision-free trajectory and uses the known vehicle model (VM) module 512 to fulfill dynamical constraints. It does this by computing the errors in the equations of motion. It also provides derivatives of those errors to be able to improve on them. The distance computation method for obstacles (DCMO) module 513 ensures that a collision-free trajectory is found by computing the distances between the obstacles and the vehicle when travelling along the trajectory, and derivatives thereof. The distance computation to the reference trajectory (DCRT) module 514 selects from all dynamically feasible, collision-free trajectories the one that comes closest to the reference path (either the initial guess 500 or the output of PP 501) by computing the distance between the current trajectory and the reference trajectory and derivatives thereof. VM 512, DCMO 513 and DCRT 514 compute first-order derivatives with respect to the currently planned configuration of the vehicle and with respect to the currently planned time and might also provide second-order derivatives.

This result is then submitted to a quality check decision 515 with a comparison on a predefined quality metric. In particular, the computed errors and distances and the respective derivatives are used to determine if the current trajectory can be further improved. If the quality check is positive, meaning that a locally optimal, collision free and dynamically feasible trajectory fulfilling all constraints has been found, then the sub-method ends 520 and returns the path and control parameter back to the main process.

If the quality check 515 is negative, a quality metric improving search direction 516 is computed by a first- or second-order numerical method which determines by how much each element of the currently planned trajectory should be changed to come closer to an optimal trajectory. For this, search direction 516 uses the errors and distances and the respective derivatives or sensitivities computed before by VM 512, DCMO 513 and DCRT 514.

Once said search direction 516 has been found, a step module 517 determines the amount by which the current trajectory shall be updated along the search direction, possibly optimizing the quality metrics used in the optimality check 515. This leads to a trajectory update 518 based on the non-sufficient previous trajectory plus the modifications based on search direction 516 and step length 517.

Said trajectory update 518 is fed back at the beginning of the sub method calculation 511 after having passed a time out check 525. A predetermined time is allocated to provide an improved solution over the path provided by the path planner 501 or the initial guess. If this calculation time is up, then the sub-method ends here and the control is given back to the main program. Otherwise the new modified path is introduced at the beginning 511 into the loop for a further calculation. It is of course possible to provide interrupts like time check 525 routines at any stage within the functions 512, 513, 514, 516, 517, 518 to abort the calculation at that time and return control based on the last best preferred path and control set.

Figure 5:
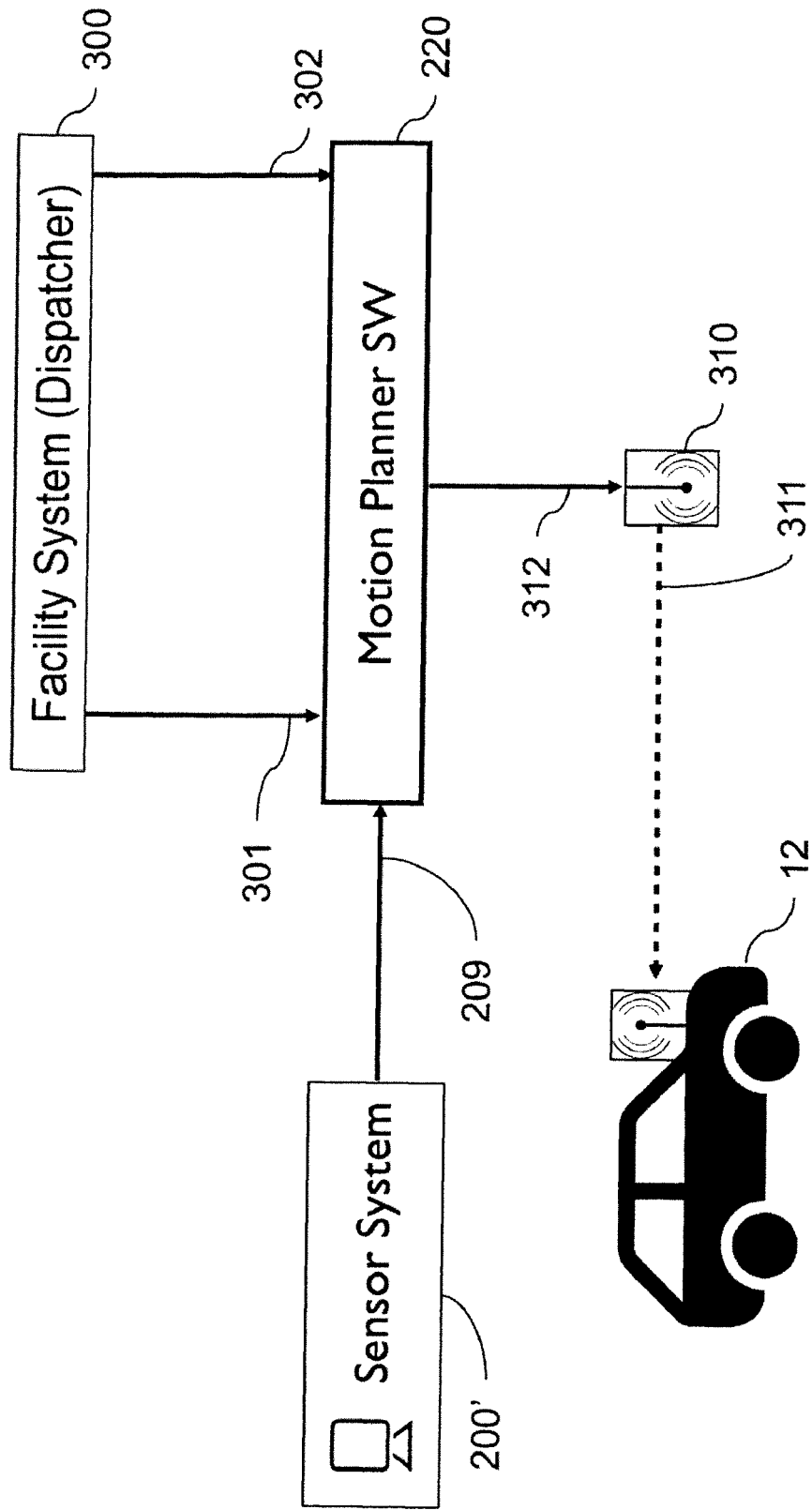
FIG. 5 shows a diagram of an automatic parking system using the apparatus according to FIG. 3 and the method according to invention.

FIG. 5 shows a diagram of an automatic parking system using control elements of the apparatus 220 according to FIG. 3 and the method according to the invention. The parking facility comprises a fixed sensor system 200' within the facility, similar to the sensor perception components 200 of the in-vehicle system of FIG. 3, comprised of one or multiple sensors. The sensor system 200' is connected via a streaming connection 209 with the motion control element 220, as in FIG. 3. The motion control element 220 is connected with a dispatcher system 300 delivering as input vehicle characteristics 302 specific to any vehicle 12 using the system as well as map and parking target information via a further input line 301. Both elements of information can be transmitted offline in preparation. Usually the map is only transmitted once because it's facility-dependent, but the target position is transmitted once per maneuver. Also, the map may change due to other parked cars. Car model updates are provided with new cars when such new cars are adapted for using the facility. The drive commands are issued by the motion control element 220 to the drive command transmitter 310 via the drive command line relating to the steering angle and acceleration and braking commands. This drive commands are updated (streamed) to the vehicle to create a feedback loop. Additionally, the total stop command for the engine is transmitted as well, when the final parking position or delivery position is reached. The drive command transmitter 310 uses a wireless transmitter line 311 to issue these actuation commands to the car via a reception system built into the car. It is possible to provide a number of drive command transmitters 310 within the facility providing handover possibilities between different transmitters.

Figure 6:
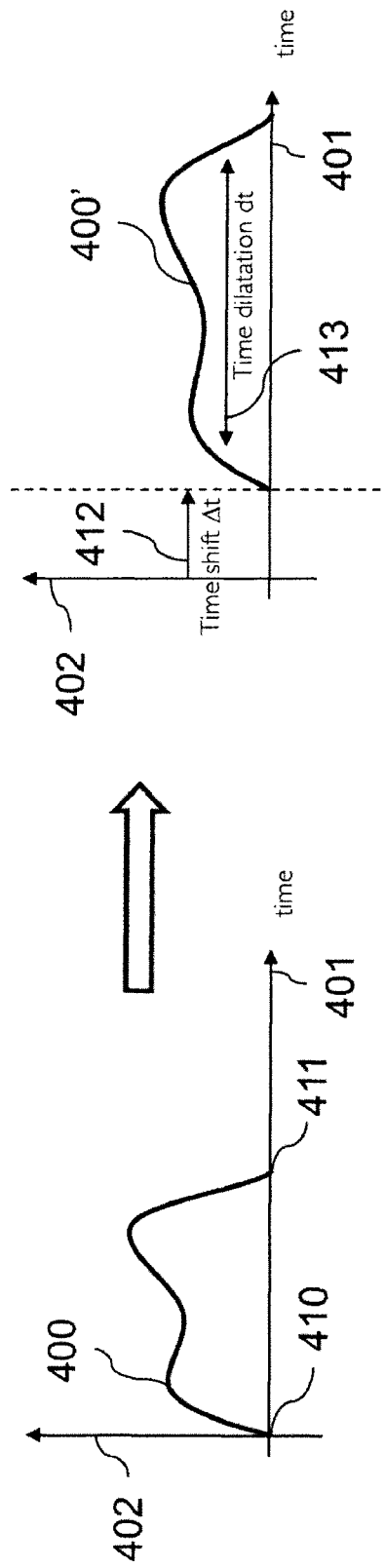
FIG. 6 shows a diagram of a collision resolution module implementing the method of the apparatus according to the invention.

FIG. 6 finally shows a diagram of a collision resolution module implementing a further embodiment of the method according to the invention. One application of the method according to the invention is to readily adapt the calculated solution in reaction to moving obstacles 14 which are not behaving as originally predicted by the prediction generator 215. At the same time, the motion control element 220 calculates a path 400 of a vehicle 12 between a starting position 410 and a target position 411, which can be an end position. The axis 402 is a schematical representation of the 2D path whereas the axis 401 is the time axis.

Said path 400 is calculated to follow a collision-free path in view of static obstacles such as walls 32, columns 34 and further elements. At the same time, due to additional sensor input relating to moving obstacles as vehicles 14, the path is optimised to allow a collision-free path in view of moving obstacles, which is achieved with path 400. At this point, several possibilities exist which might trigger an online adaptation of the path. One is a newly moving obstacle. This can request a shifted start of the path movement shown on the right-hand diagram of FIG. 6 with the shifted path 412. On the other side, an originally predicted moving vehicle 14 moves slower than expected. Therefore, the controlled vehicle should not be in the later portion of the path as early as initially calculated. Therefore, the unchanged path, unchanged in view of the different legs, is executed slower than originally calculated, i.e. it is changed to a dilated path 400' by means of time dilatation 413. It is possible to leave a first portion of the path unchanged to avoid interference with other incoming new obstacles and only dilate the later portion of the path. It is also possible, in the framework of the given comfort limits, to accelerate the movement so as to pass at a predetermined portion of the path earlier and before another vehicle. In a multi-vehicle environment it is also possible to influence the paths of two or more vehicles at the same time in order to improve the overall distribution of the vehicles in the parking facility. Then, these vehicles are preferredly connected wherein connected means by radio or other especially wireless communication means. The amended movement solution is then applied to such connected vehicles.

The embodiment according to FIG. 6 can be implemented using the method according to the invention but also only in connection with an apparatus of steering vehicles according to the invention. Then it is a preferred solution to have a central control unit encompassing the apparatus to provide instruction signals for at least a first group of user-driven connected vehicles and control signals for a second group of apparatus-driven connected vehicles, which are autonomously driven by the apparatus. The system then comprises the advantage to be able to provide a collision free trajectory calculation for all connected vehicles (and considers not-connected vehicles as moving obstacles). This allows to provide automatic parking for connected vehicles (without driver or with a non-interfering person at the drivers seat) simply based on a remote control based on wireless transmitted control signals to such vehicles, whereas driven vehicles receive driving instructions, wherein deviations of such human drivers from the intended path in terms of velocity and position are taking into account in the PI module. Then it is preferable that after initialization of a calculation of paths for the different vehicles, a clock function is incorporated in the different connected vehicles and the central control unit of the apparatus allowing to execute the different driving orders in the second group of vehicles or display of driving instructions to the drivers of the first group of vehicles so that in case of temporary loss of signal connection with the central control unit the pre-transferred control or display signals are executed and the correct synchronization is possible when the connection is up again.

LIST OF REFERENCE SIGNS

| | |
|---|---|
| 11 | vehicle, initial position |
| 12 | vehicle, target position |
| 12' | vehicle, target position |
| 12" | possible parking position |
| 13 | other cars, not moving |
| 14 | other car, moving, start position |
| 14' | other car, moving, intermediate position |
| 14" | other car, moving, position at target position of controlled car |
| 21 | parking space |
| 31 | front wall/obstacle |
| 31' | front line |
| 33 | column |
| 32 | rear wall/obstacle |
| 41 | not contemplated parking space |
| 42 | corner of parking space |
| 50 | driveway |
| 101 | car corner, initial position |
| 102 | car corner, initial position |
| 103 | car corner, initial position |
| 104 | car corner, initial position |
| 111 | corner movement line |
| 112 | corner movement line |
| 113 | corner movement line |
| 114 | corner movement line |
| 121 | car corner, intermediate position |
| 122 | car corner, intermediate position |
| 123 | car corner, intermediate position |
| 124 | car corner, intermediate position |
| 131 | corner movement line |
| 132 | corner movement line |
| 133 | corner movement line |
| 134 | corner movement line |
| 141 | car corner, intermediate position |
| 142 | car corner, intermediate position |
| 143 | car corner, intermediate position |
| 144 | car corner, intermediate position |
| 151 | corner movement line |
| 152 | corner movement line |
| 153 | corner movement line |
| 154 | corner movement line |
| 161 | car corner, final position |
| 162 | car corner, final position |
| 163 | car corner, final position |
| 164 | car corner, final position |
| 200 | perception component |
| 200' | sensor system |
| 201 | speed sensor |
| 202 | radar sensor |
| 203 | vision sensor |
| 204 | LIDAR sensor |
| 205 | inertial navigation sensor |
| 206 | GPS sensor |
| 209 | streaming connection |
| 210 | sensor fusion element |
| 211 | external maps |
| 212 | navigation system |
| 213 | behavioural planning unit |
| 215 | prediction generator |
| 217 | motion planning module |
| 218 | vehicle actuation system |
| 220 | motion control component |
| 240 | car actuation element |
| 300 | dispatcher system |
| 301 | information line |
| 302 | vehicle characteristics transmittal line |
| 310 | drive command transmitter |
| 311 | drive to car line |
| 312 | drive command line |
| 400 | schematic vehicle path |
| 401 | time |
| 402 | schematic path axis |
| 410 | starting position |
| 411 | target position |
| 500 | initial path inquiry |
| 501 | path planning (PP) |
| 502 | resampler step |
| 503 | path improver (PI) |
| 510 | initialization |
| 511 | begin of calculation |

-continued

LIST OF REFERENCE SIGNS

| | |
|---|---|
| 512 | vehicle model (VM) |
| 513 | distance computation method for obstacles (DCMO) |
| 514 | distance computation to reference trajectory (DCRT) |
| 515 | quality check decision |
| 516 | search direction method |
| 517 | step size method |
| 518 | trajectory update |
| 520 | end of sub function |
| 525 | timeout check |

The invention claimed is:

1. A computer-implemented method for steering a vehicle along a path in a driveway and around obstacles between a starting position and a target position, comprising the steps of:
   determining dimensions, steering, and driving capabilities of the vehicle; and
   based on the determined dimensions, steering, and driving capabilities, carrying out a path planner step to evaluate a least costly path between the starting position and the target position based on a predetermined cost function, this path avoiding any collisions with static obstacles, so as to obtain a first trajectory for the vehicle;
   applying a path improver function smoothening the first trajectory by performing a numerical optimization to obtain a second trajectory from the starting position to the target position of the vehicle, while fulfilling equations of motion of the vehicle as well as vehicle-related constraints, driveway-related constraints, and dynamical constraints, the dynamical constraints taken from a group encompassing intervals of acceleration, intervals of deceleration, predetermined speed interval, and steering rate of the vehicle; and
   controlling the vehicle by instructing to deliver driving signals capturing the second trajectory to a control unit of the vehicle for the control unit to steer the vehicle in accordance with the second trajectory,
   wherein the numerical optimization
      is performed by computing distances between potential trajectories and the first trajectory, and derivatives of said distances, said potential trajectories being several dynamically feasible, collision-free trajectories,
      uses one of a first-order numerical method and a second-order numerical method for continuous optimization, together with said derivatives, to obtain the second trajectory as one of said potential trajectories that comes closest to the least costly path, and
      is implemented by a nonlinear programming solver.

2. The computer-implemented method according to claim 1, further comprising:
   a prediction step, providing updated information about dynamic obstacles on the driveway and relevant to a movement of the vehicle between the starting position and the target position; and
   delivering the updated information as additional input to the path planner step and/or the path improver function for obtaining the second trajectory as a trajectory avoiding any collisions with the dynamic obstacles when moving the vehicle from the starting position to the target position.

3. The computer-implemented method according to claim 2, wherein the method further comprises:
   delaying the movement of the vehicle or dilating or accelerating the movement of the vehicle over an entirety of the least costly path between the starting position and the target position or portions of the least costly path.

4. The computer-implemented method according to claim 1, further comprising:
   performing a continuous sensor-gathering step, providing updated information about static and/or dynamic obstacles on the driveway; and
   delivering said updated information as additional input to the path planner step and/or the path improver function for obtaining the second trajectory as a trajectory avoiding any collisions with the static and/or dynamic obstacles when moving the vehicle from the starting position to the target position.

5. A non-transitory, computer-readable data storage medium storing a computer program having program codes, which, when executed on a computer, is adapted to perform a method according to claim 1.

6. The computer-implemented method according to claim 1,
   wherein the steps of determining dimensions, steering, and driving capabilities of the vehicle, carrying out the path planner step, applying the path improver function, and instructing to deliver the driving signals, are performed by a computerized apparatus on-board the vehicle.

7. A computerized apparatus for steering a vehicle along a path in a driveway and around obstacles between a starting position and a target position, wherein the apparatus is configured to:
   determine dimensions, steering, and driving capabilities of the vehicle; and
   based on the determined dimensions, steering, and driving capabilities,
      carry out a path planner step to evaluate a least costly path between the starting position and the target position based on a predetermined cost function, this path avoiding any collisions with static obstacles, so as to obtain a first trajectory for the vehicle;
      apply a path improver function smoothening the first trajectory by performing a numerical optimization to obtain a second trajectory from the starting position to the target position of the vehicle, while fulfilling equations of motion of the vehicle as well as vehicle-related constraints, driveway-related constraints, and dynamical constraints, the dynamical constraints taken from a group encompassing intervals of acceleration, intervals of deceleration, predetermined speed interval, and steering rate of the vehicle; and
      control the vehicle by instructing to deliver driving signals capturing the second trajectory to a control unit of the vehicle for the control unit to steer the vehicle in accordance with the second trajectory,
   wherein, in operation of the apparatus, the numerical optimization
      is performed by computing distances between potential trajectories and the first trajectory, and derivatives of said distances, said potential trajectories being several dynamically feasible, collision-free trajectories,
      uses one of a first-order numerical method and a second-order numerical method for continuous optimization, together with said derivatives, to obtain the second trajectory as one of said potential trajectories that comes closest to the least costly path, and
      is implemented by a nonlinear programming solver.

8. The computerized apparatus according to claim 7, comprising:
a distance computation unit configured to determine distances between the vehicle and obstacles and sensitivities of the distances between the vehicle and obstacles;
a path planning unit configured to carry out said path planner step; and
a path improving unit configured to apply the path improver function, wherein the path improving unit is further configured to plan lateral and longitudinal movement of the vehicle in a joint optimization problem or by means of separate optimization problems.

9. The computerized apparatus according to claim 7, further comprising:
a prediction generator configured to
provide updated information about dynamic obstacles on the driveway and relevant to a movement of the vehicle between the starting position and the target position, and
deliver the updated information as additional input to a path planning unit and/or the path improver function for obtaining the second trajectory as a trajectory avoiding any collision with the dynamic obstacles when moving the vehicle from the starting position and the target position, in operation.

10. The computerized apparatus according to claim 9, further comprising:
a collision resolution module, which is designed to
adapt a calculated movement of the vehicle in reaction to dynamic obstacles that are not behaving as originally predicted by the prediction generator, and
provide an amended movement for a vehicle between a starting position and a target position.

11. The computerized apparatus according to claim 10, wherein
the collision resolution module is further designed to provide said amended movement for the vehicle, wherein the amended movement is taken from a group comprising
a shifted start of the movement of the vehicle over the path,
a slower movement or a faster movement of the vehicle than originally calculated for one of the entire path,
a remaining portion of the path,
a predetermined time period, and
a time period that is determined by the collision resolution module, in operation.

12. The computerized apparatus according to claim 10, wherein
the apparatus is further configured to adapt calculated solutions and accordingly provide amended movements to several connected vehicles.

13. The computerized apparatus according to claim 12, wherein
the connected vehicles comprise user-driven vehicles and apparatus-driven vehicles, and
the apparatus further comprises a drive command transmitter and is configured to
deliver driving signals to any of the apparatus-driven, connected vehicles having a corresponding receiver and a corresponding connected car control unit to control any of the apparatus-driven, connected vehicles along the least costly path from the starting position to the target position, and
deliver driving commands to any of the user-driven connected vehicles, so as for said commands to be displayed and thereby guide users of the user-driven connected vehicles on the least costly path from the starting position to the target position.

14. The computerized apparatus according to claim 7, wherein
the apparatus is further configured to apply the path improver function to compute said second trajectory by adjusting a movement speed and/or an average movement speed in predetermined areas of the least costly path, taking into account trajectory computations of any of several vehicles and dynamic obstacles having a movement portion on or crossing the least costly path evaluated to identify bottlenecks and/or possible collision events between the vehicle and further vehicles and/or obstacles on the least costly path.

15. A parking facility system for a parking facility, comprising:
a computerized apparatus,
a plurality of perception sensors configured to monitor a driveway and to deliver entry values for a distance computation unit of said apparatus; and
a drive command transmitter,
wherein,
the apparatus is configured to
determine dimensions, steering, and driving capabilities of a vehicle presented at an entry point of the parking facility system and having a receiver and a connected car control unit to control said vehicle from a starting position to a target position; and
based on the determined dimensions, steering, and driving capabilities,
carry out a path planner step to evaluate a least costly path between the starting position and the target position based on a predetermined cost function, this path avoiding any collisions with static obstacles, so as to obtain a first trajectory for the vehicle;
apply a path improver function smoothening the first trajectory by performing a numerical optimization to obtain a second trajectory from the starting position to the target position of the vehicle, while fulfilling equations of motion of the vehicle as well as vehicle-related constraints, driveway-related constraints, and dynamical constraints, the dynamical constraints taken from a group encompassing intervals of acceleration, intervals of deceleration, predetermined speed interval, and steering rate of the vehicle; and
control the vehicle from the starting position to the target position by instructing to deliver driving signals capturing the second trajectory to the car control unit of the vehicle for the car control unit to steer the vehicle in accordance with the second trajectory,
wherein, in operation of the apparatus, the numerical optimization is performed by computing distances between potential trajectories and the first trajectory, and derivatives of said distances, said potential trajectories being several dynamically feasible, collision-free trajectories,
uses one of a first-order numerical method and a second-order numerical method for continuous optimization, together with said derivatives, to obtain the second trajectory as one of said potential trajectories that comes closest to the least costly path, and
is implemented by a nonlinear programming solver.

16. The parking facility system according to claim 15, wherein, in operation, an environment of the parking facility and the parking facility are represented in a digital map which the parking facility system is adapted to analyze with respect to an effectively drivable space using trajectory computations, so as to provide an output that is either providing an increase of the effectively drivable space or removing unreachable space from the map.

17. The parking facility system according to claim 15, wherein the parking facility system is configured to adjust movement speed and/or average movement speed in areas of the parking facility using trajectory computations of several vehicles to identify bottlenecks and packing patterns for dense garages.

* * * * *